US009643345B2

(12) United States Patent
Nakahashi et al.

(10) Patent No.: US 9,643,345 B2
(45) Date of Patent: May 9, 2017

(54) RESIN MOLDING APPARATUS AND RESIN MOLDING METHOD

(75) Inventors: Takahiro Nakahashi, Osaka (JP); Hiroyuki Hanato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 44 days.

(21) Appl. No.: 14/123,759

(22) PCT Filed: Jun. 7, 2012

(86) PCT No.: PCT/JP2012/064713
§ 371 (c)(1),
(2), (4) Date: Dec. 3, 2013

(87) PCT Pub. No.: WO2012/169599
PCT Pub. Date: Dec. 13, 2012

(65) Prior Publication Data
US 2014/0103552 A1   Apr. 17, 2014

(30) Foreign Application Priority Data

Jun. 8, 2011   (JP) .................................. 2011-128558

(51) Int. Cl.
| B29C 37/00 | (2006.01) |
| B29D 11/00 | (2006.01) |
| B29C 33/44 | (2006.01) |
| B29C 45/56 | (2006.01) |
| B29C 43/02 | (2006.01) |
(Continued)

(52) U.S. Cl.
CPC .......... *B29C 37/0003* (2013.01); *B29C 33/44* (2013.01); *B29C 43/021* (2013.01); *B29C 43/50* (2013.01); *B29C 45/568* (2013.01);

*B29D 11/00192* (2013.01); *B29D 11/00432* (2013.01); *B29C 2043/5092* (2013.01); *B29L 2011/0016* (2013.01)

(58) Field of Classification Search
CPC ... B29C 33/44; B29C 37/0003; B29C 45/568; B29C 2043/5092; B29C 43/021; B29C 43/50; B29D 11/00432; B29D 11/00192; B29L 2011/0016
USPC ....................................... 264/1.36; 425/174.2
See application file for complete search history.

(56) References Cited

FOREIGN PATENT DOCUMENTS

| JP | 61-283509 A | 12/1986 |
| JP | 04-361010 A | 12/1992 |
(Continued)

OTHER PUBLICATIONS

Machine Translation of JP 2007-320037.*
(Continued)

Primary Examiner — Robert J Grun
(74) Attorney, Agent, or Firm — Nixon & Vanderhye P.C.

(57) ABSTRACT

A lens molding apparatus (100) of the present invention includes: a mold (1) having a transfer surface (1a) for transferring a predetermined lens shape to a resin material; a mold (2) having a transfer surface (2a) for transferring a predetermined lens shape to the resin material; a support device (3) for moving the mold (1); a heating device (4) curing the resin material so as to form a lens, the resin material having been supplied between the transfer surface (1a) and the transfer surface (2a); and an ultrasonic vibrator (5) applying vibration from a side surface of the mold (1 or 2) so as to form a gap at least at a part between the transfer surface (1a or 2a) and the lens.

1 Claim, 13 Drawing Sheets

(51) Int. Cl.
    *B29C 43/50*     (2006.01)
    *B29L 11/00*     (2006.01)

(56) References Cited

FOREIGN PATENT DOCUMENTS

| | | |
|---|---|---|
| JP | 2004-74445 A | 3/2004 |
| JP | 2007-320037 A | 12/2007 |
| JP | 2010-266664 A | 11/2010 |

OTHER PUBLICATIONS

International Search Report for PCT/JP2012/064713, mailed Aug. 21, 2012.
Written Opinion for PCT/JP2012/064713, mailed Aug. 21, 2012.

\* cited by examiner

RESIN MOLDING APPARATUS AND RESIN MOLDING METHOD

This application is the U.S. national phase of International Application No. PCT/JP2012/064713 filed 7 Jun. 2012 which designated the U.S. and claims priority to JP Patent Application No. 2011-128558 filed 8 Jun. 2011, the entire contents of each of which are hereby incorporated by reference.

TECHNICAL FIELD

The present invention relates to a resin molding apparatus and a resin molding method, and in particular, to a lens molding apparatus and a lens molding method each of which makes it possible to easily and highly accurately mold a lens having a complex shape.

BACKGROUND ART

A conventionally employed lens molding method for molding a lens includes pressing, against a resin material, a mold having a transfer surface for transferring a lens shape and curing the resin material in a state where the mold is pressed against this resin material. In this lens molding method, a molded lens is released from the mold after the resin material is cured. However, when the molded lens is released from the mold, the molded lens may be damaged due to adhesion between the lens and the transfer surface.

In order to solve the above problem, Patent Literature 1 discloses a technique for releasing a molded lens from a mold in a compound lens molding apparatus. According to this technique, as illustrated in FIG. 12, the molded lens is released from a mold 400, by applying a high-frequency voltage to the mold 400 and vibrating a molding surface 401 of the mold 400. In this method, the molding surface 401 undergoes elastic deformation and thereby an adhesion strength between the lens and the molding surface 401 can be decreased. Therefore, the molded lens may be safely released from the mold by the method.

Patent Literature 2 discloses a method for releasing a resin molded product from a mold with use of an ultrasonic wave. In Patent Literature 2, as illustrated in FIG. 13, a molded product 502 is molded by (i) first injecting resin such as epoxy resin having an adhesion effect into a mold 501 which is a casting mold exposed to the atmosphere and which has a cavity 501a and (ii) curing the resin by heating. After molding, a flat vibrator 503 is provided so as to be in direct contact with a top surface of the molded product 502. Then, vibration is directly transferred from the vibrator 503 to the molded product 502. As a result, the molded product 502 can be easily peeled off from the mold 501.

Patent Literature 3 also discloses a similar technique to that disclosed in Patent Literature 2.

CITATION LIST

Patent Literatures

[Patent Literature 1]
Japanese Patent Application Publication, Tokukaihei, No. 4-361010 A (Publication Date: Dec. 14, 1992)
[Patent Literature 2]
Japanese Patent Application Publication, Tokukai, No. 2004-74445 (Publication Date: Mar. 11, 2004)
[Patent Literature 3]
Japanese Patent Application Publication, Tokukai, No. 2010-266664 (Nov. 25, 2010)

SUMMARY OF INVENTION

Technical Problem

As optical systems are improved so as to have a higher performance, a technique for accurately processing a thin-wall lens having a complex shape becomes important. In particular, a thin-wall lens having a largely varying thickness and a large aspherical surface cannot ensure a sufficient rigidity. As a result, the lens itself may be damaged, for example, deformed or cracked, due to a load that is applied on the lens adhered to a mold at the time when the lens is peeled off from the mold. Accordingly, it is required in molding an aspherical lens or the like, to reduce a resistance between a molded product and a mold as much as possible. Further, in such molding, there is a problem in that mold release is difficult.

However, in the techniques disclosed in Patent Literatures 1 to 3, because a vibrator is put in direct contact with a molded product and therefore, a whole of the molded product is vibrated. Accordingly, in a case where the molded product is a thin-wall lens, the thin-wall lens tends to be damaged.

The present invention is attained in view of the above problems. An object of the present invention is to provide a resin molding apparatus and a resin molding method each of which makes it possible to easily and highly accurately mold a resin molded product.

Solution to Problem

In order to solve the above problems, a resin molding apparatus of the present invention includes: a first mold having a first transfer surface for transferring a predetermined shape to a resin material; a second mold having a second transfer surface for transferring a predetermined shape to the resin material, the second transfer surface being opposed to the first transfer surface; moving means that shifts a relative position of the first mold and the second mold; curing means that cures the resin material so as to form a resin molded product, the resin material having been supplied between the first transfer surface and the second transfer surface; and first vibration applying means that applies vibration from a side surface of the first mold so as to form a gap at least at a part between the first transfer surface and the resin molded product.

According to the above arrangement, a resin material supplied between the first transfer surface of the first mold and the second transfer surface of the second mold is cured by curing means, so that a resin molded product is formed. Here, after the resin material is cured and before the first transfer surface is separated from the resin molded product by moving means, vibration is applied by the first vibration applying means from a side surface of the first mold and thereby, a gap is formed at least at a part between the first transfer surface and the resin molded product. This gap serves as a starting point from which the resin molded product and the first transfer surface are separated from each other. Moreover, because the vibration is applied from the side surface of the first mold, only part of the first mold is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, the resin molded product and the first transfer surface can be easily separated from each other. Therefore, it is possible to provide a resin molding apparatus capable of easily and highly accurately molding a resin molded product.

A resin molding apparatus of the present invention includes: a base plate; a mold having a transfer surface for transferring a predetermined shape to a resin material; moving means that shifts a relative position of the base plate and the mold; curing means that cures the resin material so as to form a resin molded product, the resin material having been supplied between the base plate and the transfer surface; and first vibration applying means that applies vibration from a side surface of the mold so as to form a gap at least at a part between the transfer surface and the resin molded product.

According to the above arrangement, a resin material supplied between the base plate and the transfer surface of the mold is cured by curing means, so that a resin molded product is formed. Here, after the resin material is cured and before the transfer surface is separated from the resin molded product by moving means, vibration is applied by the first vibration applying means from a side surface of the mold and thereby, a gap is formed at least at a part between the transfer surface and the resin molded product. This gap serves as a starting point from which the resin molded product and the transfer surface are separated from each other. Moreover, because the vibration is applied from the side surface of the mold, only part of the mold is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, the resin molded product and the transfer surface can be easily separated from each other. Therefore, it is possible to provide a resin molding apparatus capable of easily and highly accurately molding a resin molded product.

A resin molding method of the present invention includes the steps of: (a) curing a resin material so as to form a resin molded product, the resin material having been supplied between a first transfer surface of a first mold and a second transfer surface of a second mold; (b) separating the first transfer surface from the resin molded product; (c) removing the resin molded product from the second mold; and (d) applying vibration from a side surface of the first mold between the steps (a) and (b) so as to form a gap at least at a part between the first transfer surface and the resin molded product.

According to the above arrangement, in the step (a) of curing a resin material, the resin material supplied between the first transfer surface of the first mold and the second transfer surface of the second mold is cured by curing means, so that a resin molded product is formed. Here, between the step (a) of curing the resin material and the step (b) of separating the first transfer surface from the resin molded product, vibration is applied from a side surface of the first mold and thereby, a gap is formed at least at a part between the first transfer surface and the resin molded product. This gap serves as a starting point from which the resin molded product and the first transfer surface are separated from each other in the step (b) of separating the first transfer surface from the resin molded product. Moreover, because the vibration is applied from the side surface of the first mold, only part of the first mold is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, the resin molded product and the first transfer surface can be easily separated from each other. Therefore, it is possible to provide a resin molding method that makes it possible to easily and highly accurately mold a resin molded product.

A resin molding method of the present invention includes the steps of: (a) curing a resin material so as to form a resin molded product, the resin material having been supplied between a base plate and a transfer surface of a mold; (b) separating the transfer surface from the resin molded product; (c) removing the resin molded product from the base plate; and (d) applying vibration to the mold by applying vibration from a side surface of the mold between the steps (a) and (b) so as to form a gap at least at a part between the transfer surface and the resin molded product.

According to the above arrangement, in the step (a) of curing a resin material, the resin material supplied between the base plate and the transfer surface of the mold is cured by curing means, so that a resin molded product is formed. Here, between the step (a) of curing the resin material and the step (b) of separating the transfer surface from the resin molded product, vibration is applied from a side surface of the mold and thereby, a gap is formed at least at a part between the transfer surface and the resin molded product. This gap serves as a starting point from which the resin molded product and the transfer surface are separated from each other in the step (b) of separating the transfer surface from the resin molded product. Moreover, because the vibration is applied from the side surface of the mold, only part of the mold is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, the resin molded product and the transfer surface can be easily separated from each other. Therefore, it is possible to provide a resin molding method that makes it possible to easily and highly accurately mold a resin molded product.

A resin molding method of the present invention includes the steps of: (a) curing a resin material so as to form a resin molded product, the resin material having been supplied between a base plate and a transfer surface of a mold; (b) separating the base plate from the resin molded product; (c) removing the resin molded product from the mold; and (d) applying vibration to the base plate by applying vibration from a side surface of the base plate between the steps (a) and (b) so as to form a gap at least at a part between the base plate and the resin molded product.

According to the above arrangement, in the step (a) of curing a resin material, the resin material supplied between the base plate and the transfer surface of the mold is cured by curing means, so that a resin molded product is formed. Here, between the step (a) of curing the resin material and the step (b) of separating the base plate from the resin molded product, vibration is applied from a side surface of the base plate and thereby, a gap is formed at least at a part between the resin molded product and the base plate. This gap serves as a starting point from which the resin molded product and the base plate are separated from each other in the step (b) of separating the base plate from the resin molded product. Moreover, because the vibration is applied from the side surface of the base plate, only part of the base plate is vibrated. As described above, the vibration is indirectly applied to the resin molded product. Therefore, a load on the resin molded product can be reduced when the vibration is applied. Consequently, the resin molded product and the base plate can be easily separated from each other. Therefore, it is possible to provide a resin molding method that makes it possible to easily and highly accurately mold a resin molded product.

Advantageous Effects of Invention

As described above, a resin molding apparatus of the present invention is arranged to include: a first mold having a first transfer surface for transferring a predetermined shape to a resin material; a second mold having a second transfer surface for transferring a predetermined shape to the resin material, the second transfer surface being opposed to the first transfer surface; moving means that shifts a relative position of the first mold and the second mold; curing means that cures the resin material so as to form a resin molded product, the resin material having been supplied between the first transfer surface and the second transfer surface; and first vibration applying means that applies vibration from a side surface of the first mold so as to form a gap at least at a part between the first transfer surface and the resin molded product. Moreover, a resin molding method of the present invention is arranged to include the steps of: (a) curing a resin material so as to form a resin molded product the resin material having been supplied between a first transfer surface of a first mold and a second transfer surface of a second mold; (b) separating the first transfer surface from the resin molded product; (c) removing the resin molded product from the second mold; and (d) applying vibration from a side surface of the first mold between the steps (a) and (b) so as to form a gap at least at a part between the first transfer surface and the resin molded product.

Therefore, the present invention can provide a resin molding apparatus and a resin molding method each of which makes it possible to easily and highly accurately mold a resin molded product.

Figure 9:
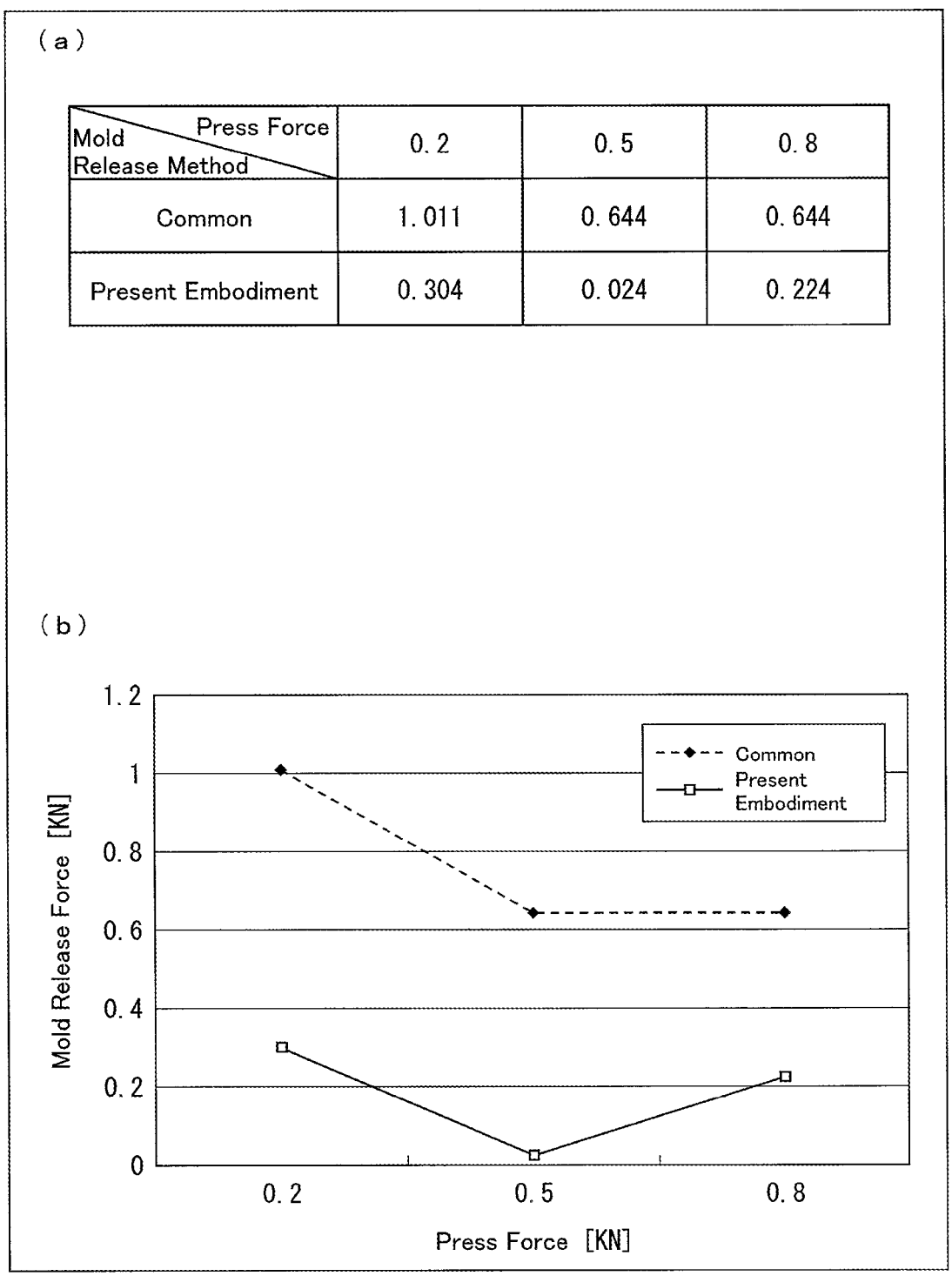

(a) of FIG. 9 is a table showing a relation between press force indicating an initial pressure at the time of mold release and mold release force required for the mold release; and (b) of FIG. 9 is a graph showing the relation.

Figure 10:
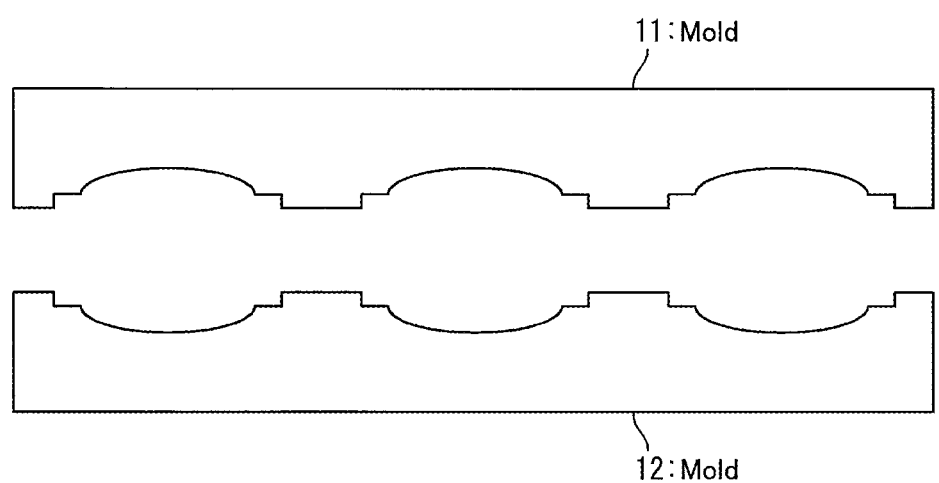

FIG. 10 is a modified example of the molds.

Figure 11:
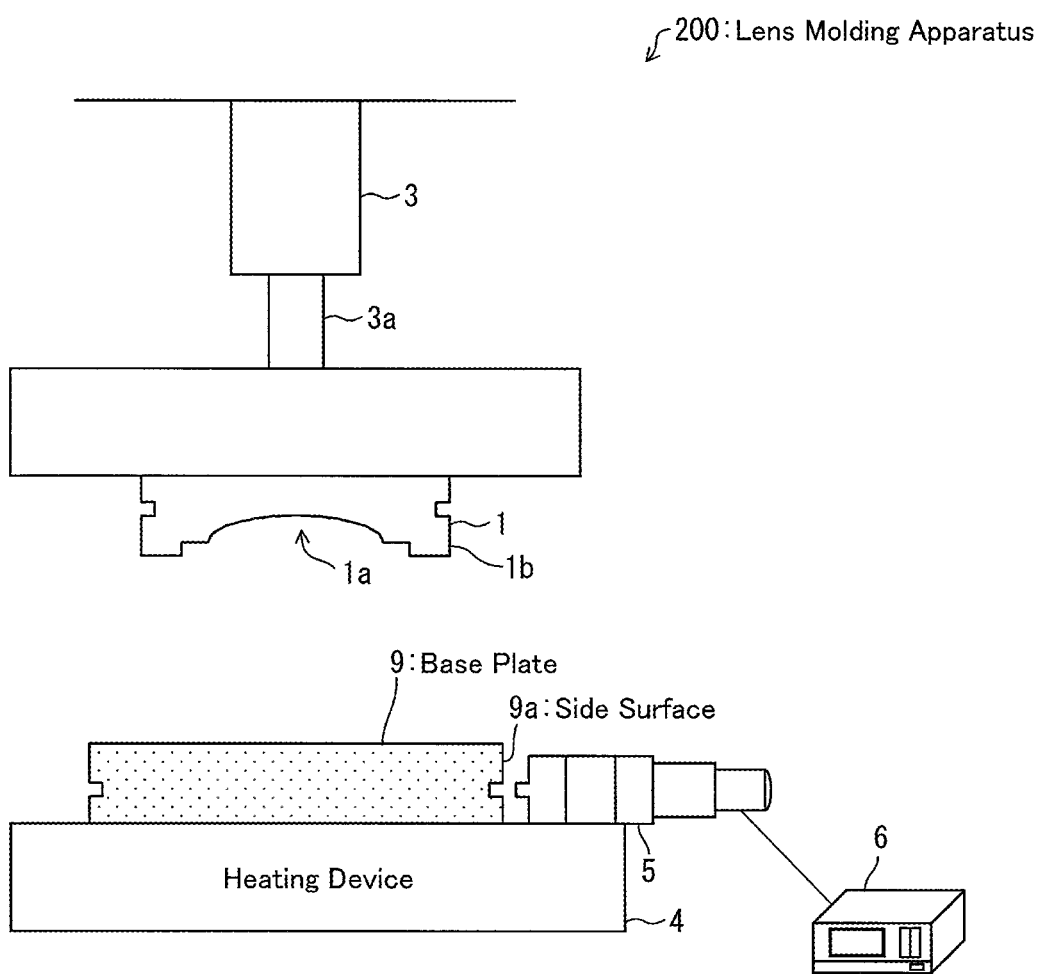

FIG. 11 is a view illustrating an arrangement of a lens molding apparatus according to a modified example of the embodiment of the present invention.

Figure 12:
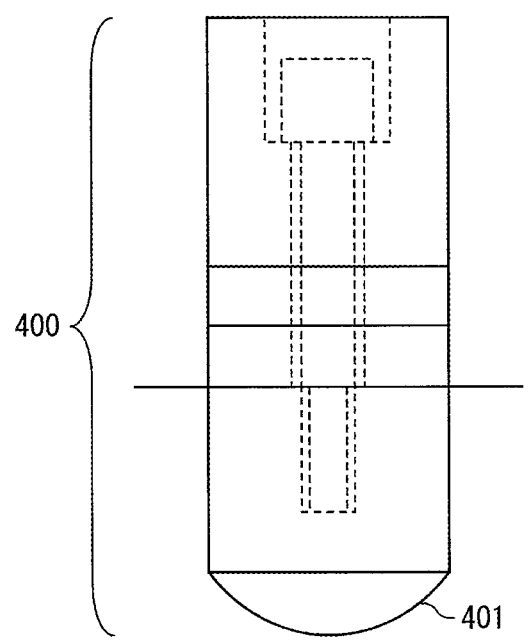

FIG. 12 is a view illustrating a mold of a conventional lens molding apparatus.

Figure 13:
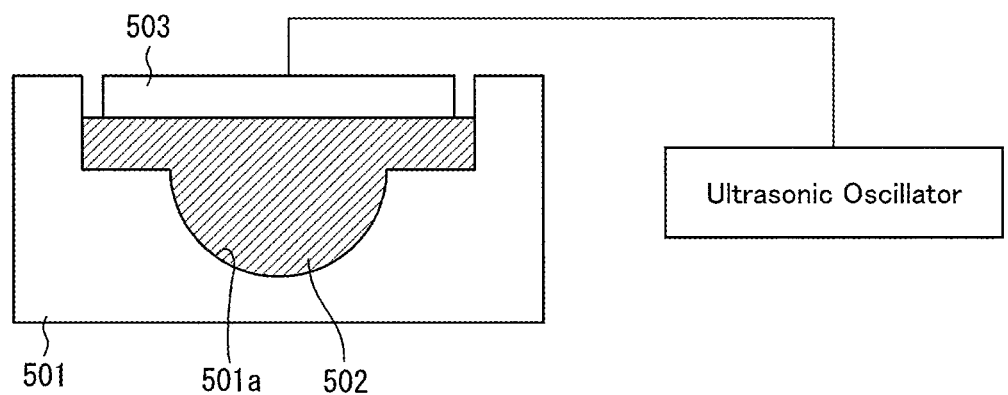

FIG. 13 is a view illustrating a mold of another conventional lens molding apparatus.

DESCRIPTION OF EMBODIMENTS

The following discusses one embodiment of the present invention, with reference to FIGS. 1 through 10.

(Arrangement of Lens Molding Apparatus)

Figure 1:
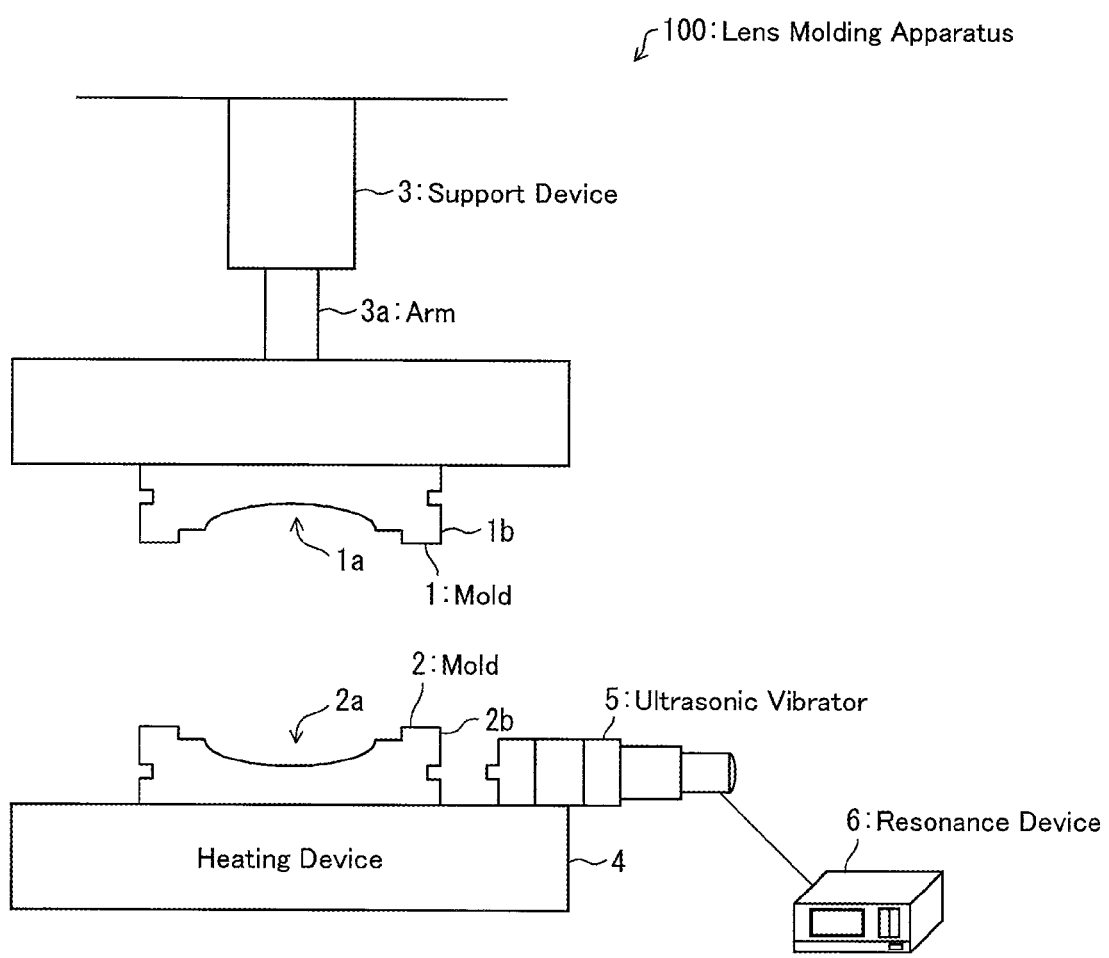
FIG. 1 is a view illustrating an arrangement of a lens molding apparatus according to an embodiment of the present invention.

FIG. 1 is a view illustrating an arrangement of a lens molding apparatus (resin molding apparatus) 100 according to the present embodiment. The lens molding apparatus 100 is an apparatus for molding a lens from a resin material, and includes a mold 1, a mold 2, a support device 3, a heating device 4, an ultrasonic vibrator 5, and a resonance device 6.

The mold 1 corresponds to a first mold in the claims and is supported by the support device 3. The mold 2 corresponds to a second mold in the claims and is provided on the heating device 4. The support device 3 has an extendable arm 3a and is capable of moving the mold 1 up and down in FIG. 1. Note that the support device 3 corresponds to moving means in the claims.

The mold 1 has a transfer surface 1a for transferring a predetermined lens shape to a resin material. At the center of the transfer surface 1a, an aspherical depression is formed. Similarly, the mold 2 has a transfer surface 2a for transferring a predetermined lens shape to the resin material. At the center of this transfer surface 2a, an aspherical depression is formed. The transfer surface 1a and the transfer surface 2a are opposed to each other.

The heating device 4 corresponds to curing means in the claims and cures, by heating the mold 2, the resin material supplied between the transfer surface 1a and the transfer surface 2a. The start/end of this heating may be controlled by a sequence program or the like, or alternatively controlled manually.

The ultrasonic vibrator 5 corresponds to each of first vibration applying means and second vibration applying means in the claims, and produces ultrasonic vibration in accordance with signals supplied from the resonance device 6. The ultrasonic vibrator 5 is attachable to a side surface 1b of the mold 1 and a side surface 2b of the mold 2.

(Step of Molding Lens)

Next, the following discusses the step of molding a lens in the lens molding apparatus 100, with reference to FIGS. 2 through 8.

Figure 2:
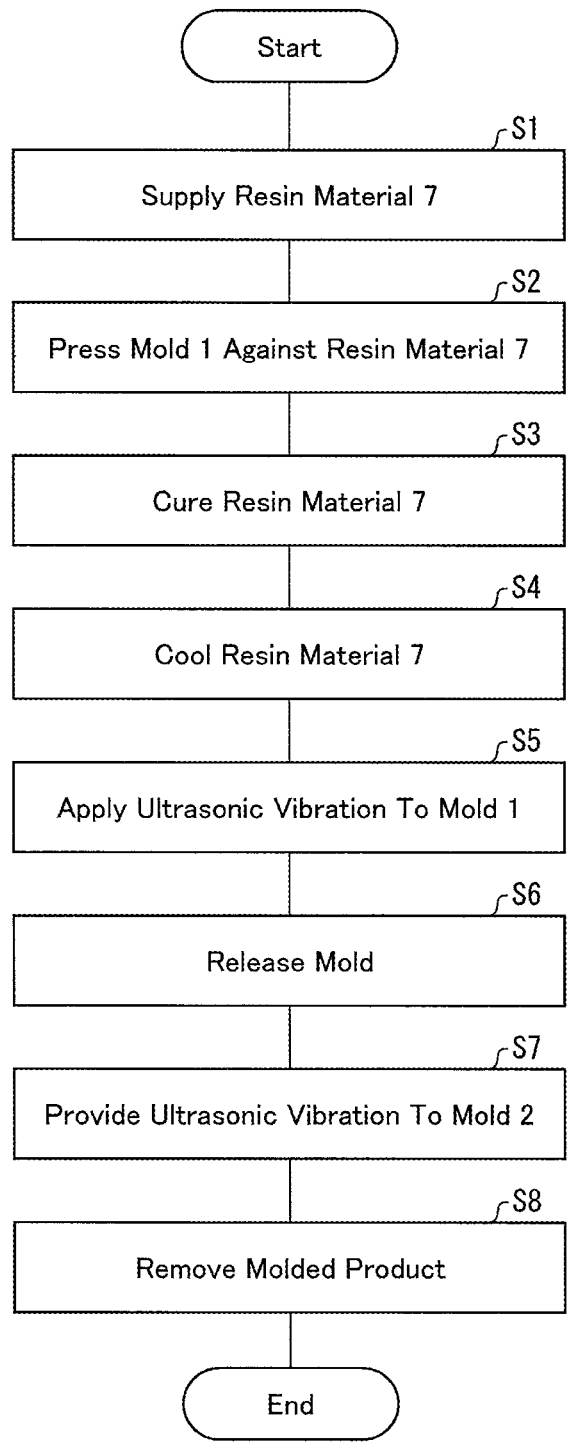
FIG. 2 is a flowchart illustrating a procedure in the step of molding a lens according to the embodiment of the present invention.

FIG. 2 is a flowchart illustrating a procedure in the step of molding a lens according to the present embodiment.

Figure 3:
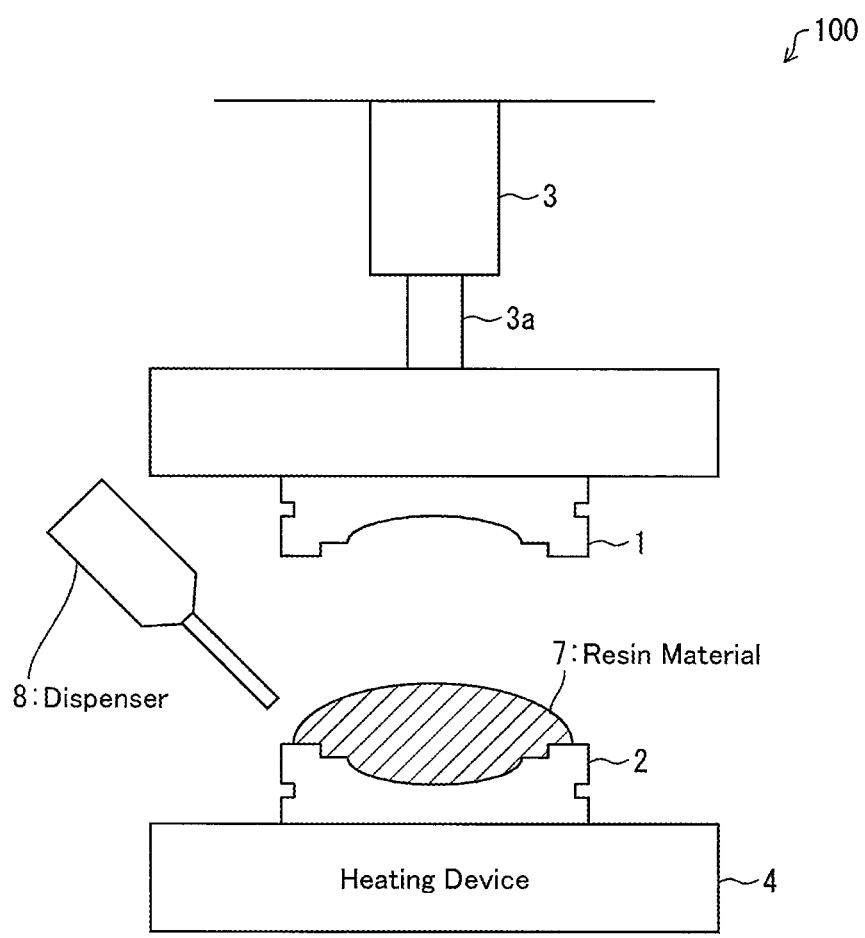
FIG. 3 is a view illustrating a state in which a resin material is supplied to a transfer surface of one mold.

First, in Step S1, the resin material 7 is supplied between the transfer surface 1a of the mold 1 and the transfer surface 2a of the mold 2. For example, as illustrated in FIG. 3, by use of a dispenser 8, the resin material 7 is supplied onto the transfer surface 2a of the mold 2. The resin material 7 is a thermosetting resin that is cured by heating.

Figure 4:
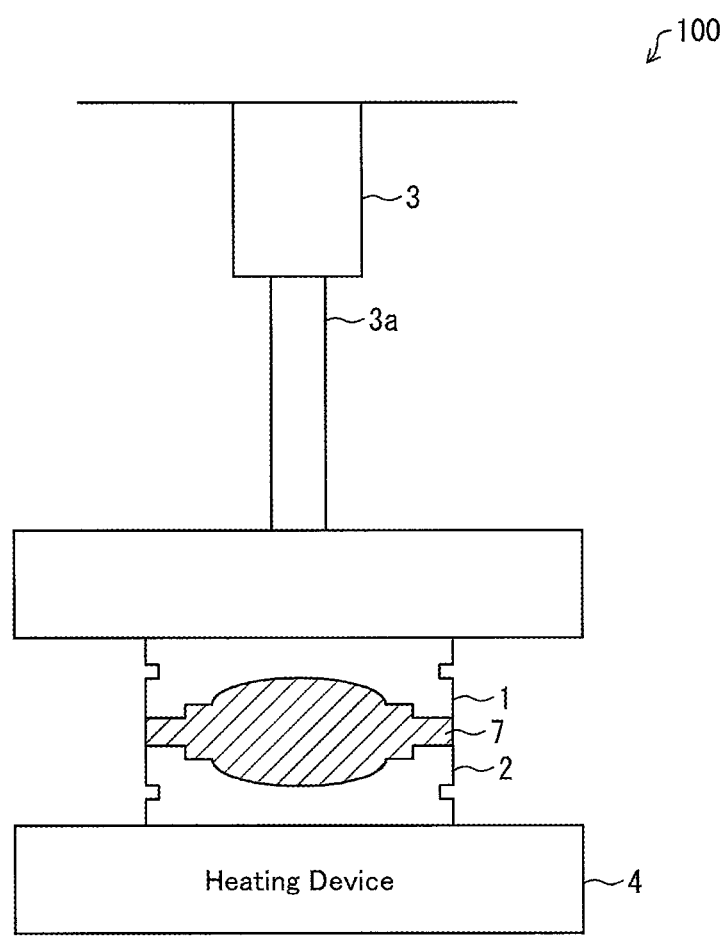
FIG. 4 is a view illustrating a state in which the resin material is cured by heating while a transfer surface of another mold is pressed against the resin material.

Next, as illustrated in FIG. 4, the transfer surface 1a of the mold 1 is pressed against the resin material 7 (Step S2). In this state, the mold 2 is heated by the heating device 4. As a result, the resin material 7 is cured (Step S3, the step of curing a resin material).

Subsequently, heating is stopped and the resin material 7 is cooled (Step S4). As a result, a lens 17 is formed.

Figure 5:
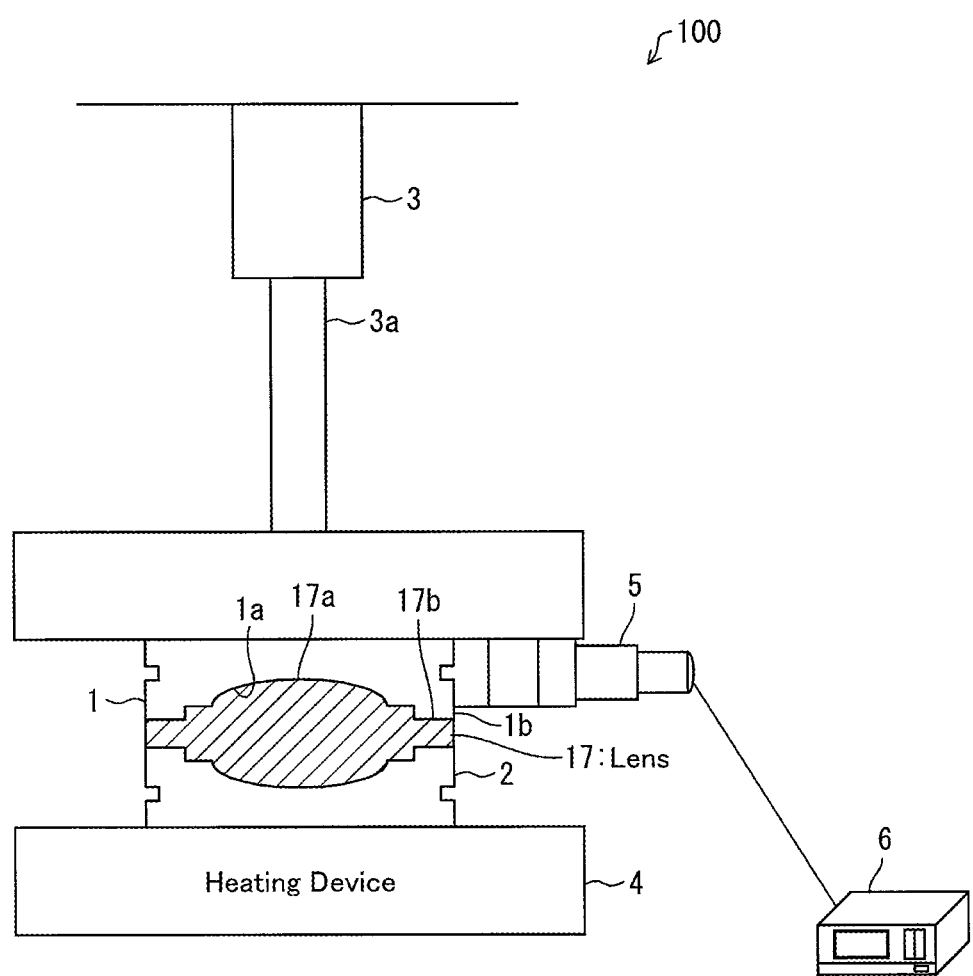
FIG. 5 is a view illustrating a state in which ultrasonic vibration is applied from a side surface of the another mold.

Next, as illustrated in FIG. 5, the ultrasonic vibrator 5 is attached to the side surface 1b of the mold 1. Then, the resonance device 6 is caused to output a signal, so that the ultrasonic vibrator 5 is vibrated. As a result, the ultrasonic vibrator 5 applies ultrasonic vibration of, for example, 27 kHz from the side surface 1b, and the mold 1 vibrates in a radial direction of the lens 17 (a shear direction, a surface direction of the transfer surface 1a) (Step S5, the first vibration applying step, the first step of applying vibration). This vibration causes elastic deformation of the mold 1 locally in the shear direction and produces a shear locally between the transfer surface 1a and the lens 17. Consequently, adhesion between the transfer surface 1a of the mold 1 and the lens 17 decreases. At the same time, at least a part of a surface of the lens 17 slightly peels off from the transfer surface 1a. As a result, a gap is formed at least at a part between the transfer surface 1a and the lens 17.

Figure 6:
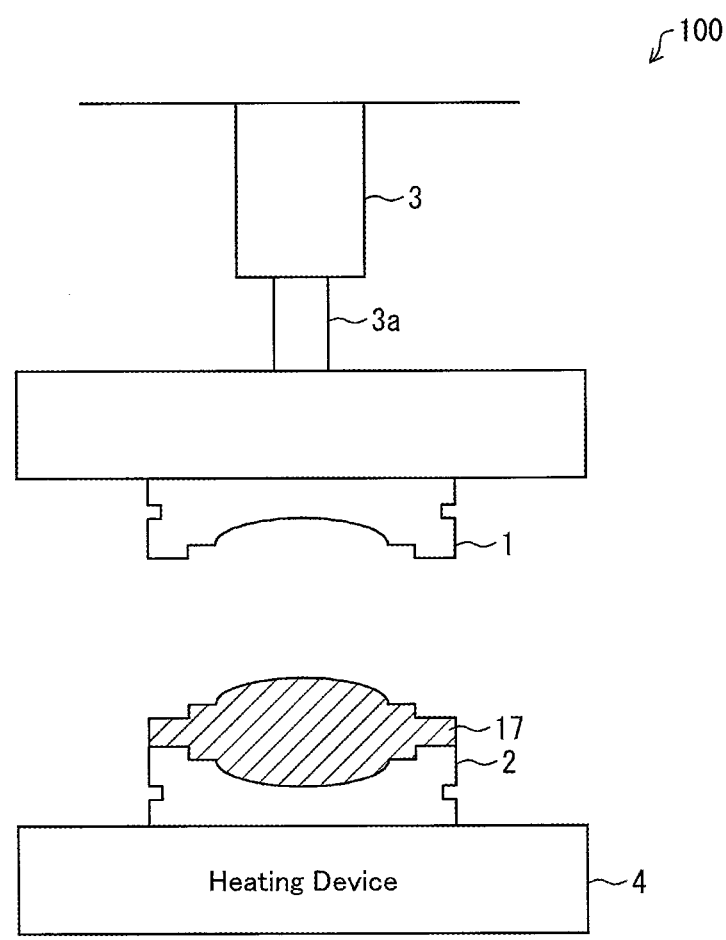
FIG. 6 is a view illustrating a state in which the transfer surface of the another mold is separated from the lens.

Subsequently, as illustrated in FIG. 6, the transfer surface 1a of the mold 1 is separated from the lens 17 (Step S6, the step of separating/releasing a mold). As described above, a gap is formed at least at a part between the transfer surface 1a and the lens 17. Accordingly, at the time of mold release, this gap stretches out all over a boundary between the transfer surface 1a and the lens 17. Therefore, it becomes possible to easily release the mold 1 from the lens 17 without putting a load on the lens 17.

Figure 7:
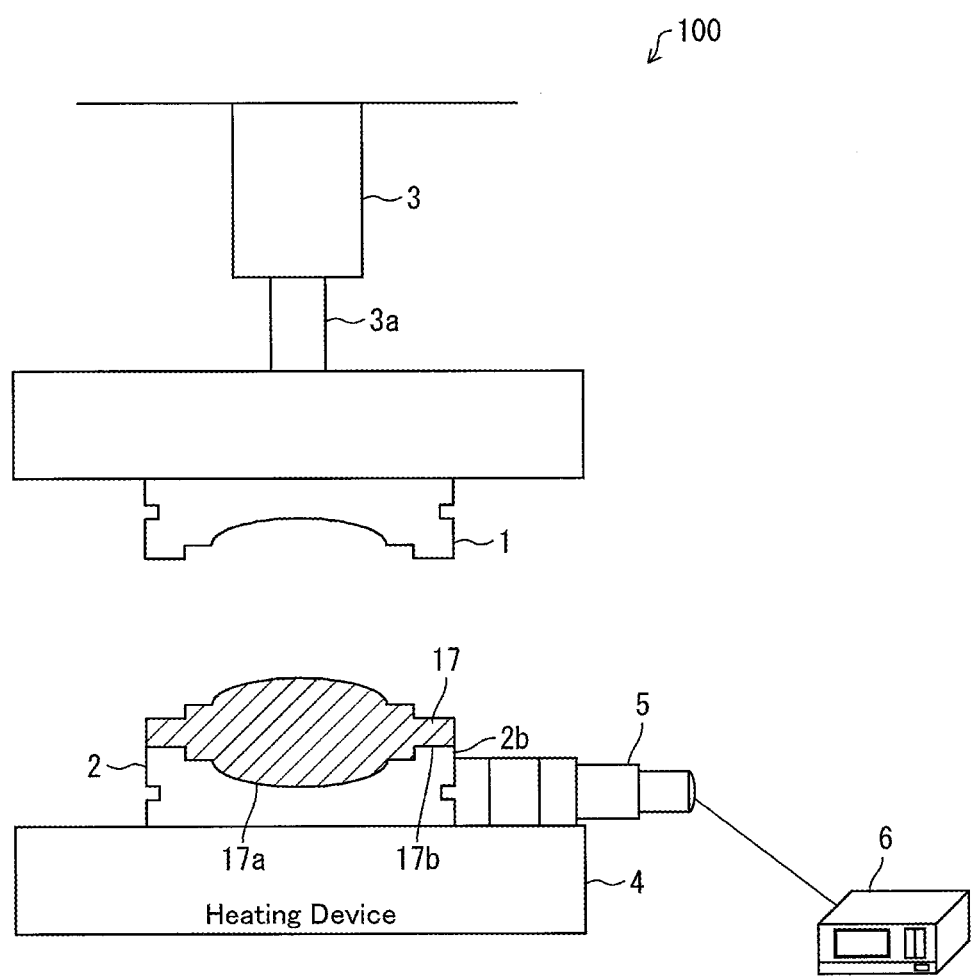
FIG. 7 is a view illustrating a state in which ultrasonic vibration is applied from a side surface of the one mold.

Next, as illustrated in FIG. 7, the ultrasonic vibrator 5 is attached to the side surface 2b of the mold 2. Then, the resonance device 6 is caused to output a signal, so that the ultrasonic vibrator 5 is vibrated. As a result, the ultrasonic vibrator 5 applies ultrasonic vibration of, for example, 27 kHz from the side surface 2b and the mold 2 vibrates in a radial direction of the lens 17 (a shear direction, a surface direction of the transfer surface 2a) (Step S7, the second vibration applying step, the second step of applying vibration). This vibration causes elastic deformation of the mold 2 locally in the shear direction and produces a shear locally between the transfer surface 2a and the lens 17. More specifically, because a surface roughness of the transfer surface 2a is fine, a vacuum gap is formed between the lens 17 and the transfer surface 2a. Consequently, adhesion between the transfer surface 2a of the mold 2 and the lens 17 decreases. At the same time, at least a part of a surface of the lens 17 slightly peels off from the transfer surface 2a. As a result, a gap is formed at least at a part between the transfer surface 2a and the lens 17.

Figure 8:
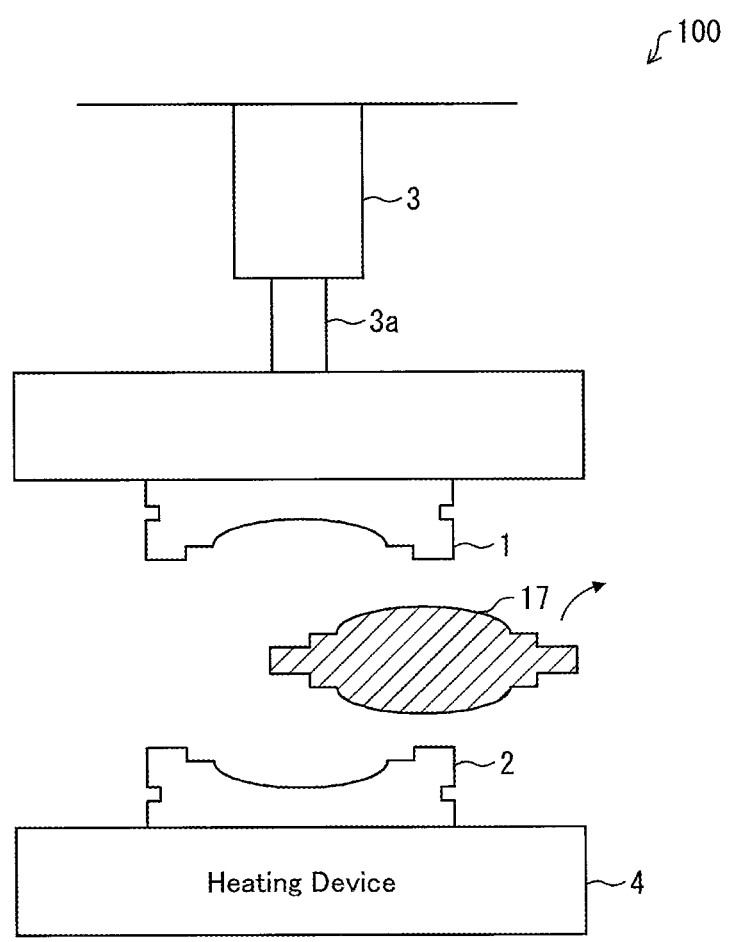
FIG. 8 is a view illustrating a state in which the lens is removed from the one mold.

Subsequently, as illustrated in FIG. 8, the lens 17 is removed from the mold 2 (Step S8, the step of removing a molded product). As described above, a gap is formed at least at a part between the transfer surface 2a and the lens 17. Accordingly, when the lens 17 is removed from the mold 2, this gap stretches out all over a boundary between the transfer surface 2a and the lens 17. Therefore, it becomes possible to easily remove the lens 17 from the mold 2 without putting a load on the lens 17.

As described above, prior to Step S6 (the step of separating/releasing a mold), a gap is formed locally between the lens 17 and the transfer surface 1a by applying vibration in the radial direction of the lens 17 to the mold 1, and prior to Step S8 (the step of removing a molded product), a gap is formed locally between the lens 17 and the transfer surface 2a by applying vibration in the radial direction of the lens 17 to the mold 2. These gaps serve as starting points from which the lens 17 is separated from the transfer surfaces 1a and 2a, respectively. Therefore, the lens 17 can be easily separated from the transfer surfaces 1a and 2a.

Note that in the above step of molding a lens, the mold 1 is first separated from the lens and then the lens is removed from the mold 2. However, the present invention is not limited to this, but can be arranged such that the mold 2 is first separated from the lens and then the lens is removed from the mold 1. In other words, the order of the first vibration applying step and the second vibration applying step can be reversed. In this way, ultrasonic vibration is first applied to a mold in contact with a lens surface which is on an opposite side to a lens surface in contact with another mold in which it is desired that the lens remain after the step of separating/releasing the lens from the mold. This makes it possible to control a position from which the lens is removed.

(Effects of Reducing Mold Release Force)

(a) of FIG. 9 is a table showing a relation between press force indicating an initial pressure (force at which the transfer surface is pressed against the resin material) at the time of mold release and mold release force required for the mold release; and (b) of FIG. 9 is a graph showing this relation. In (b) of FIG. 9, a solid line shows release force in a method of the present embodiment according to which ultrasonic vibration at 27 kHz is applied to a mold prior to mold release and a dotted line shows release force in a common method according to which no ultrasonic vibration is applied. As is clear from this graph, the release force could be reduced by approximately 70% by applying the ultrasonic vibration prior to the mold release.

Further, in the present embodiment, because the ultrasonic vibration is applied from the side surface of the mold, only part of the mold vibrates. Therefore, as compared to a conventional arrangement where a whole transfer surface of a mold is vibrated, a load onto a lens can be reduced at the time when the vibration is applied.

Further, in Step S5, as illustrated in FIG. 5, preferably, a gap is formed at least at a part between a non-optical surface 17b of the lens 17 and the transfer surface 1a in contact with the non-optical surface 17b; and no gap is formed between the optical surface 17a of the lens 17 and the transfer surface 1a. Similarly, in Step S7, as illustrated in FIG. 7, preferably, a gap is formed at least at a part between a non-optical surface 17b of the lens 17 and the transfer surface 1a in contact with the non-optical surface 17b; and no gap is formed between the optical surface 17a of the lens 17 and the transfer surface 1a. Here, the optical surface means a surface involved in optical spot formation of the lens 17 whereas the non-optical surface means a surface that is not involved in the optical spot formation of the lens 17. The non-optical surface is arranged as, for example, a flat flange section and formed on an outer periphery of the optical surface.

Strength of the ultrasonic vibration is controlled so that a gap is formed only at the non-optical surface 17b of the lens 17. This makes it possible to further reduce the load onto the optical surface 17a and further to suppress influence on performance of the lens 17 to the minimum.

As described above, the lens molding apparatus 100 of the present embodiment can easily and highly accurately mold a lens having a complex shape. Further, this lens molding apparatus 100 also can easily mold a lens having a largely varying thickness and a large aspherical surface while widening a range of a resin material for the lens.

Note that the molds 1 and 2 each employed for lens molding are molds for forming one lens in the present embodiment, but for example, molds for molding a plurality of lens provided in an array, such as molds 11 and 12 as illustrated in FIG. 10, may be used.

(Load on Lens)

Next, the following discusses a load applied on the lens at the time when the ultrasonic vibration is applied. The ultrasonic vibration includes a component in a direction that is orthogonal to the transfer surface; however, a component in a radial direction of the lens (a surface direction of the transfer surface) is dominant in the ultrasonic vibration. Therefore, shear mold release force is mainly produced between the lens and the transfer surface. When the ultrasonic vibration is simple harmonic motion in the radial direction of the lens, a displacement amount z of the lens with respect to the transfer surface is expressed as follows:

$$z = A\sin(2\pi f t) \quad \text{[Expression 1]}$$

where: A is an amplitude of the ultrasonic vibration; and f is a frequency of the ultrasonic vibration. Moreover, a velocity v of the ultrasonic vibration and an acceleration a of the ultrasonic vibration are respectively expressed as follows:

$$v = \frac{dz}{dt} = 2\pi f A \cos(2\pi f t) \quad \text{[Expression 2]}$$

$$a = \frac{dv}{dt} = -4\pi^2 f^2 A \sin(2\pi f t).$$

When F is a maximum value of force acting in the surface direction of the transfer surface, $$F = Ma = Sh\rho \cdot 4\pi^2 f^2 A \quad \text{[Expression 3]}$$

where: M is a mass of the lens; S is an area of the lens; h is a thickness of the lens; and ρ is a density of the lens. Further, when P is a maximum value of force acting on a unit area of the lens, $$P = F/S = 4\pi^2 f^2 A h \rho \quad \text{[Expression 4]}$$

Meanwhile, a maximum value of the velocity is:

$$v = 2\pi f A \quad \text{[Expression 5]}$$

Here, phases of the velocity and the acceleration are shifted relative to each other by π/2. Accordingly, when the acceleration is maximum, the velocity becomes 0. Therefore, the closer the force P per unit area in the surface direction of the transfer surface is with respect to a minimum value of force necessary for mold release, the smaller the velocity of the lens after mold release becomes. Further, the larger the frequency f is, the more the velocity of the lens after the mold release can be suppressed with respect to the force in the surface direction of the transfer surface. Therefore, the closer the shear mold release force generated between the lens and the transfer surface is to the minimum value of the force necessary for mold release and the larger the frequency of the ultrasonic vibration is, the more the load on the lens can be suppressed.

Therefore, the vibration applied to the mold or a base plate prior to the step of separating/releasing the mold from a molded product and the step of removing a molded product is preferably ultrasonic vibration in a range of 20 kHz to 60 kHz though it varies depending on materials of the lens and the mold.

Modified Example

Next, the following discusses a modified example of the present embodiment. Note that for convenience of the explanation, each member having an identical function to a member discussed above is given the same reference sign and an explanation thereof is omitted.

FIG. 11 is a view illustrating an arrangement of a lens molding apparatus 200 according to the modified example of the present embodiment. The lens molding apparatus 200 is arranged by replacing the mold 2 in the lens molding apparatus 100 as illustrated in FIG. 1 to a base plate 9. The base plate 9 is provided on a heating device 4 and an ultrasonic vibrator 5 is attachable to a side surface 9a of the base plate 9.

The step of molding a lens in the lens molding apparatus 200 is substantially the same as that in the lens molding apparatus 100. That is, a resin material is supplied between the base plate 9 and a transfer surface 1a of a mold 1. Then, in a state where the transfer surface 1a is pressed against the resin material, the resin material is cured by heating so that the lens is formed. Next, ultrasonic vibration is applied by the ultrasonic vibrator 5 from a side surface 1b of the mold 1 so that a gap is formed at least at a part between the transfer surface 1a and the lens (the step of applying vibration to a mold). Subsequently, the transfer surface 1a is separated from the lens. Further, ultrasonic vibration is applied by the ultrasonic vibrator 5 from the side surface 9a of the base plate 9 so that a gap is formed at least at a part between the base plate 9 and the lens (the step of applying vibration to a base plate). Thereafter, the lens is removed from the base plate 9.

In this way, before the transfer surface 1a is separated from the lens, a gap is formed locally between the lens and the transfer surface 1a by applying vibration in a radial direction of the lens to the mold 1; and before the lens is removed from the base plate 9, a gap is formed locally between the lens and the base plate 9 by applying vibration in a radial direction of the lens to the base plate 9. These gaps serve as starting points from which the lens is separated from the transfer surfaces 1a and the base plate 9. This makes it possible to easily separate lens from the transfer surface 1a and the substrate 9.

Note that in the step of molding a lens in the lens molding apparatus 200, the order of the step of applying vibration to the mold and the step of applying vibration to the base plate may be reversed. In other words, after the lens is formed by curing the resin material, first ultrasonic vibration is applied by the ultrasonic vibrator 5 from the side surface 9a of the base plate 9 so that a gap is formed at least at a part between the base plate 9 and the lens. Then, the base plate 9 is separated from the lens by moving the mold 1 upward. As a result, the lens is adhered to the transfer surface 1a of the mold 1. Subsequently, while a side surface of the lens is being supported by a support member or the like, ultrasonic vibration is applied by the ultrasonic vibrator 5 from the side surface 1b of the mold 1 so that a gap is formed at least at a part between the transfer surface 1a and the lens. Thereafter, the lens is removed from the transfer surface 1a.

(Additional Matters)

In the above-described embodiment, ultrasonic vibration is applied to the mold or the base plate. However, vibration applied to the mold or the base plate is not limited to ultrasonic vibration. As long as a gap can be formed between the lens and the transfer surface or the base plate, the vibration may be acoustic wave vibration of less than 20 kHz.

Further, in the above-described embodiment, one ultrasonic vibrator is used to apply ultrasonic vibration to two molds, or to a mold and a base plate. However, separate ultrasonic vibrators may be used to apply ultrasonic vibration to two molds, respectively, or to a mold and a base plate, respectively. In other words, one member may be used for both first vibration applying means and second vibration applying means in the claims or separate members may be used respectively for first vibration applying means and second vibration applying means in the claims. Further, the ultrasonic vibrator may be movable by use of a sliding mechanism.

The present invention is not limited to the description of the embodiment above, but may be altered by a skilled person within the scope of the claims. An embodiment based on a proper combination of technical means modified as appropriate within the scope of the claims is encompassed in the technical scope of the present invention.

As described above, preferably, the resin molding apparatus according to the embodiment of the present invention further includes second vibration applying means that applies vibration from a side surface of the second mold so as to form a gap at least at a part between the second transfer surface and the resin molded product.

After a first transfer surface is separated from the resin molded product and before the resin molded product is removed from the second mold, vibration is applied by the second vibration applying means from a side surface of the second mold and thereby, a gap is formed at least at a part between the second transfer surface and the resin molded product. This gap serves as a starting point from which the resin molded product and the second transfer surface are separated from each other. Moreover, because the vibration is applied from the side surface of the second mold, only part of the second mold is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, the resin molded product and the second mold can be easily separated from each other.

Preferably, the resin molding apparatus of the embodiment of the present invention further includes second vibration applying means that applies vibration from a side surface of the base plate so as to form a gap at least at a part between the base plate and the resin molded product.

After the transfer surface is separated from the resin molded product and before the resin molded product is removed from the base plate, vibration is applied by the second vibration applying means from a side surface of the base plate and thereby, a gap is formed at least at a part between the base plate and the resin molded product. This gap serves as a starting point from which the resin molded product and the base plate are separated from each other. Moreover, because the vibration is applied from the side surface of the base plate, only part of the base plate is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, it is possible to easily remove the resin molded product from the base plate.

In the resin molding apparatus of the embodiment of the present invention, preferably, the first vibration applying means and the second vibration applying means are provided by use of one member.

In the resin molding apparatus of the embodiment of the present invention, preferably, the vibration is ultrasonic vibration.

The lager the frequency of the vibration applied to the mold or the base plate is, the more the velocity of the resin molded product after mold release can be suppressed relative to force in a surface direction of the transfer surface or the base plate at the time when the vibration is applied. Therefore, by arranging the vibration to ultrasonic vibration, a load on the resin molded product can be suppressed.

In the resin molding apparatus of the embodiment of the present invention, preferably, the resin molded product is one or more lenses.

In the embodiment of the present invention, mold release can be performed without putting a load on the resin material. Therefore, the embodiment of the present invention is particularly suitable for molding a lens having a complex shape.

According to the arrangement, it is possible to reduce the number of members constituting the resin molding apparatus.

In the resin molding apparatus of the embodiment of the present invention, preferably, the lens has an optical surface and a non-optical surface formed on an outer periphery of the optical surface; and the gap is formed at least at a part between the non-optical surface and a surface in contact with the non-optical surface but no gap is formed between the optical surface and a surface in contact with the optical surface.

According to the arrangement, a gap is formed only at the non-optical surface of the resin molded product. Accordingly, it is possible to further reduce a load on the optical surface at the time when the mold is released or the resin molded product is removed. This makes it possible to suppress influence on performance of the resin molded product to the minimum.

Preferably, the resin molding method of the embodiment of the present invention further includes the step of applying vibration from a side surface of the second mold so as to form a gap at least at a part between the second transfer surface and the resin molded product, the vibration being applied between the step of separating the first transfer surface from the resin molded product and the step of removing the resin molded product.

According to the above arrangement, between the step of separating the first transfer surface from the resin molded product and the step of removing the resin molded product, vibration is applied from a side surface of the second mold and thereby, a gap is formed at least at a part between the second transfer surface and the resin molded product. This gap serves as a starting point from which the resin molded product and the second transfer surface are separated from each other in the step of removing the resin molded product. Moreover, because the vibration is applied from the side surface of the second mold, only part of the second mold is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, the resin molded product and the second mold can be easily separated from each other.

Preferably, the resin molding method of the embodiment of the present invention further includes the step of applying vibration to the base plate by applying vibration from a side surface of the base plate so as to form a gap at least at a part between the base plate and the resin molded product, the vibration being applied between the step of separating the transfer surface from the resin molded product and the step of removing the resin molded product.

In the above arrangement, between the step of separating the transfer surface from the resin molded product and the step of removing the resin molded product, vibration is applied from the side surface of the base plate, and thereby, a gap is formed at least at a part between the base plate and the resin molded product. This gap becomes a starting point from which the resin molded product and the base plate are separated from each other in the step of removing the resin molded product. Further, because the vibration is applied from the side surface of the base plate, only part of the base plate is vibrated. As described above, the vibration is indirectly applied to the resin molded product. Therefore, a load on the resin molded product can be reduced when the vibration is applied. Consequently, it is possible to easily remove the resin molded product from the base plate.

Preferably, the resin molding method of the embodiment of the present invention, further includes the step of applying vibration to the mold by applying vibration from a side surface of the mold so as to form a gap at least at a part between the transfer surface and the resin molded product, the vibration being applied between the step of separating the base plate from the resin molded product and the step of removing the resin molded product.

According to the above arrangement, between the step of separating the base plate from the resin molded product and the step of removing the resin molded product, vibration is applied from a side surface of the mold and thereby, a gap is formed at least at a part between the transfer surface and the resin molded product. This gap serves as a starting point from which the resin molded product and the transfer surface are separated from each other in the step of removing the resin molded product. Moreover, because the vibration is applied from the side surface of the mold, only part of the mold is vibrated. As described above, the vibration is indirectly applied to the resin molded product. Therefore, as compared to a conventional arrangement in which a whole transfer surface of a mold is vibrated, a load on the resin molded product can be reduced when the vibration is applied. Consequently, it is possible to easily remove the resin molded product from the base plate.

In the resin molding method of the embodiment of the present invention, preferably, the vibration is ultrasonic vibration.

The lager the frequency of the vibration applied to the mold or the base plate is, the more the velocity of the resin molded product after mold release can be suppressed relative to force in a surface direction of the transfer surface or the base plate at the time when the vibration is applied. Therefore, by arranging the vibration to ultrasonic vibration, a load on the resin molded product can be suppressed.

In the resin molding method of the embodiment of the present invention, preferably, the resin molded product is one or more lenses.

In the present invention, mold release can be performed without putting a load on the resin material. Therefore, the embodiment of the present invention is particularly suitable for molding a lens having a complex shape.

In the resin molding apparatus of the embodiment of the present invention, preferably, the lens has an optical surface and a non-optical surface formed on an outer periphery of the optical surface; and the gap is formed at least at a part between the non-optical surface and a surface in contact with the non-optical surface but no gap is formed between the optical surface and a surface in contact with the optical surface.

According to the arrangement, a gap is formed only at the non-optical surface of the resin molded product. Accordingly, it is possible to further reduce a load on the optical surface in the step of separating the first transfer surface, the transfer surface or the base plate from the resin molded product or the step of removing the resin molded product. This makes it possible to suppress influence on performance of the resin molded product to the minimum.

INDUSTRIAL APPLICABILITY

The present invention is applicable not only to a lens molding apparatus but also to an apparatus for molding any resin molded product other than lenses.

REFERENCE SIGNS LIST 1 mold
1a transfer surface
1b side surface
2 mold
2a transfer surface
2b side surface
3 support device
3a arm
4 heating device
5 ultrasonic vibrator
6 resonance device
7 resin material
8 dispenser
9 base plate
9a side surface
11 mold
12 mold
17 lens
17a optical surface
17b non-optical surface
100 lens molding apparatus
200 lens molding apparatus

The invention claimed is:

1. A resin molding method comprising the steps of:
(a) curing a resin material so as to form a resin molded product, the resin material having been supplied between a first transfer surface of a first mold and a second transfer surface of a second mold;
(b) separating the first transfer surface from the resin molded product;
(c) removing the resin molded product from the second mold;
(d) causing an ultrasonic vibrator to apply ultrasonic vibration, from a side surface of the first mold, between the steps (a) and (b) so as to form a first gap at least at a part between the first transfer surface and the resin molded product; and
(e) causing an ultrasonic vibrator to apply ultrasonic vibration, from a side surface of the second mold, between the steps (b) and (c) such that only part of the second mold is vibrated so as to form a second gap at least at a part between the second transfer surface and the resin molded product;
wherein:
the resin molded product comprises one or more lenses;
the one or more lenses has an optical surface and a non-optical surface formed on an outer periphery of the optical surface;
the gap is formed at least at a part between the non-optical surface and a surface in contact with the non-optical surface but no gap is formed between the optical surface and a surface in contact with the optical surface;
in step (b), the first transfer surface is separated from the resin molded product while the gap formed in step (d)

serves as a starting point from which the resin molded product and the first transfer surface are separated from each other;

in step (b), an arm separates the first mold from the resin molded product so as to make a distance between the first transfer surface of the first mold and a surface of the resin molded product;

in step (d), when causing the ultrasonic vibrator to apply ultrasonic vibration from the side surface of the first mold, a projection of the ultrasonic vibrator is inserted into a depression of the side surface of the first mold so that the ultrasonic vibrator is fixed to the first mold;

in step (e), when causing the ultrasonic vibrator to apply ultrasonic vibration from the side surface of the second mold, the projection of the ultrasonic vibrator is inserted into a depression of the side surface of the second mold so that the ultrasonic vibrator is fixed to the second mold; and in steps (d) and (e), ultrasonic vibration whose frequency falls within a range of 20 kHz to 60 kHz is applied.

\* \* \* \* \*